United States Patent
Boivie

(10) Patent No.: US 9,954,875 B2
(45) Date of Patent: Apr. 24, 2018

(54) PROTECTING FROM UNINTENTIONAL MALWARE DOWNLOAD

(71) Applicant: International Business Machines Corporation, Armonk, NY (US)

(72) Inventor: Richard H. Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/933,960

(22) Filed: Nov. 5, 2015

(65) Prior Publication Data

US 2017/0134402 A1 May 11, 2017

(51) Int. Cl.
*G06F 12/16* (2006.01)
*H04L 29/06* (2006.01)

(52) U.S. Cl.
CPC .......... *H04L 63/1416* (2013.01); *H04L 63/06* (2013.01); *H04L 63/0876* (2013.01)

(58) Field of Classification Search
CPC .......... G06F 21/53; G06F 21/74; G06F 21/56; H04L 63/1416
USPC ........................................................ 726/23
See application file for complete search history.

(56) References Cited

U.S. PATENT DOCUMENTS

| | | | |
|---|---|---|---|
| 4,926,481 A | 5/1990 | Collins, Jr. | |
| 5,222,139 A | 6/1993 | Takaragi et al. | |
| 5,481,613 A | 1/1996 | Ford et al. | |
| 5,615,263 A | 3/1997 | Takahashi | |
| 5,748,782 A | 5/1998 | Ferreira et al. | |
| 5,845,281 A | 12/1998 | Benson et al. | |
| 6,185,685 B1 | 2/2001 | Morgan et al. | |
| 6,397,331 B1 | 5/2002 | Ober et al. | |
| 6,523,118 B1 | 2/2003 | Buer | |
| 6,704,871 B1 | 3/2004 | Kaplan et al. | |
| 6,708,273 B1 | 3/2004 | Ober et al. | |
| 6,751,709 B2 | 6/2004 | Seidl et al. | |
| 6,807,577 B1 | 10/2004 | Gillespie et al. | |
| 6,968,420 B1 | 11/2005 | Giles et al. | |
| 7,043,616 B1 | 5/2006 | McGrath | |
| 7,055,040 B2 | 5/2006 | Klemba et al. | |
| 7,136,488 B2 | 11/2006 | Hashimoto et al. | |
| 7,167,956 B1 | 1/2007 | Wright et al. | |

(Continued)

FOREIGN PATENT DOCUMENTS

| | | |
|---|---|---|
| CN | 101465727 A | 6/2009 |
| JP | H07287514 A | 10/1995 |

(Continued)

OTHER PUBLICATIONS

Lin et al, Efficient Spear-Phishing Threat Detection Using Hypervisor Monitor, IEEE, 2015, pp. 299-303.*

(Continued)

*Primary Examiner* — Kari Schmidt
*Assistant Examiner* — Jenise Jackson
(74) *Attorney, Agent, or Firm* — Yee & Associates, P.C.; Jeffrey S. LaBaw

(57) ABSTRACT

Protection from malware download is provided. A first input is received to access one of an email attachment or a web site link using an application. A newly generated secure virtual machine is obtained from one of a network server or a cloud computing service. The one of the email attachment or the web site link is sent to the newly generated secure virtual machine for processing.

15 Claims, 7 Drawing Sheets

(56) References Cited

U.S. PATENT DOCUMENTS

| | | |
|---|---|---|
| 7,249,225 B1 | 7/2007 | Seidl et al. |
| 7,260,726 B1 | 8/2007 | Doe et al. |
| 7,290,288 B2 | 10/2007 | Gregg et al. |
| 7,483,930 B1 | 1/2009 | Wright et al. |
| 7,516,331 B2 | 4/2009 | Jin et al. |
| 7,747,877 B2 | 6/2010 | Jin et al. |
| 7,865,733 B2 | 1/2011 | Goto |
| 7,933,413 B2 | 4/2011 | Steeves et al. |
| 8,041,947 B2 | 10/2011 | O'Brien et al. |
| 8,055,910 B2 | 11/2011 | Kocher et al. |
| 8,086,871 B2 | 12/2011 | McIntosh et al. |
| 8,108,641 B2 | 1/2012 | Goss et al. |
| 8,156,298 B1* | 4/2012 | Stubblefield ........ G06F 12/1433 711/163 |
| 8,381,288 B2 | 2/2013 | Sahita et al. |
| 8,392,725 B2 | 3/2013 | McIntosh et al. |
| 8,464,011 B2 | 6/2013 | Krig |
| 8,479,276 B1 | 7/2013 | Vaystikh et al. |
| 8,479,286 B2 | 7/2013 | Dalcher et al. |
| 8,572,400 B2 | 10/2013 | Lin et al. |
| 8,578,175 B2 | 11/2013 | Boivie et al. |
| 8,738,932 B2 | 5/2014 | Lee et al. |
| 8,812,860 B1 | 8/2014 | Bray |
| 8,819,446 B2 | 8/2014 | Boivie |
| 8,839,455 B1 | 9/2014 | Tormasov |
| 8,954,752 B2 | 2/2015 | Boivie et al. |
| 9,098,442 B2 | 8/2015 | Boivie et al. |
| 9,542,563 B2* | 1/2017 | Baessler ................ G06F 21/62 |
| 9,613,210 B1* | 4/2017 | Wang ................ G06F 9/45533 |
| 2001/0010722 A1 | 8/2001 | Enari |
| 2001/0014157 A1 | 8/2001 | Hashimoto et al. |
| 2001/0050990 A1 | 12/2001 | Sudia |
| 2002/0064283 A1 | 5/2002 | Parenty |
| 2002/0172368 A1 | 11/2002 | Peterka |
| 2004/0003262 A1 | 1/2004 | England et al. |
| 2004/0039926 A1 | 2/2004 | Lambert |
| 2004/0123127 A1 | 6/2004 | Teicher et al. |
| 2004/0139346 A1 | 7/2004 | Watt et al. |
| 2004/0181303 A1 | 9/2004 | Walmsley et al. |
| 2005/0038998 A1 | 2/2005 | Ueno et al. |
| 2005/0044390 A1 | 2/2005 | Trostle |
| 2005/0076226 A1 | 4/2005 | Boivie et al. |
| 2005/0105738 A1 | 5/2005 | Hashimoto |
| 2005/0108551 A1 | 5/2005 | Toomey |
| 2005/0166069 A1 | 7/2005 | Hashimoto et al. |
| 2005/0177742 A1 | 8/2005 | Benson et al. |
| 2005/0235148 A1 | 10/2005 | Scheidt et al. |
| 2005/0273856 A1* | 12/2005 | Huddleston ............. G06F 21/53 726/22 |
| 2006/0021029 A1* | 1/2006 | Brickell ................ G06F 21/51 726/22 |
| 2006/0041759 A1 | 2/2006 | Kaliski et al. |
| 2006/0048099 A1* | 3/2006 | Templin ................ G06F 21/53 717/124 |
| 2006/0106801 A1 | 5/2006 | Cox et al. |
| 2006/0156418 A1 | 7/2006 | Polozoff |
| 2006/0242611 A1 | 10/2006 | Drake |
| 2007/0006294 A1 | 1/2007 | Hunter |
| 2007/0033642 A1 | 2/2007 | Ganesan et al. |
| 2007/0047735 A1 | 3/2007 | Celli et al. |
| 2007/0101124 A1 | 5/2007 | Pitts |
| 2007/0106993 A1* | 5/2007 | Largman ............... G06F 9/5077 718/104 |
| 2007/0130463 A1 | 6/2007 | Law et al. |
| 2007/0133795 A1 | 6/2007 | Kahn et al. |
| 2008/0072068 A1 | 3/2008 | Wang et al. |
| 2008/0086603 A1 | 4/2008 | Lahtinen et al. |
| 2008/0109903 A1 | 5/2008 | Werner et al. |
| 2008/0133935 A1 | 6/2008 | Elovici et al. |
| 2008/0155273 A1 | 6/2008 | Conti |
| 2008/0205651 A1 | 8/2008 | Goto |
| 2008/0222420 A1 | 9/2008 | Serret-Avila |
| 2008/0270806 A1 | 10/2008 | Nakamura |
| 2008/0282093 A1 | 11/2008 | Hatakeyama |
| 2008/0288786 A1 | 11/2008 | Fiske |
| 2008/0301441 A1 | 12/2008 | Calman et al. |
| 2009/0006796 A1 | 1/2009 | Chang |
| 2009/0006864 A1 | 1/2009 | Hashimoto et al. |
| 2009/0216974 A1 | 8/2009 | Morishima et al. |
| 2009/0217385 A1 | 8/2009 | Teow et al. |
| 2009/0240717 A1 | 9/2009 | Mimatsu |
| 2009/0249492 A1 | 10/2009 | Boesgaard Sorensen |
| 2009/0259857 A1 | 10/2009 | Gehrmann |
| 2009/0271867 A1 | 10/2009 | Zhang |
| 2009/0300139 A1 | 12/2009 | Shoemaker et al. |
| 2009/0300366 A1 | 12/2009 | Gueller et al. |
| 2009/0319782 A1 | 12/2009 | Lee |
| 2010/0017604 A1 | 1/2010 | Husa |
| 2010/0017625 A1 | 1/2010 | Johnson et al. |
| 2010/0031061 A1 | 2/2010 | Watanbe et al. |
| 2010/0119068 A1 | 5/2010 | Harris |
| 2010/0153746 A1 | 6/2010 | Takeuchi et al. |
| 2010/0161904 A1 | 6/2010 | Cypher et al. |
| 2010/0169948 A1 | 7/2010 | Budko et al. |
| 2010/0262824 A1 | 10/2010 | Keshavachar et al. |
| 2010/0263029 A1 | 10/2010 | Tohmo et al. |
| 2010/0281273 A1* | 11/2010 | Lee .................. G06F 21/72 713/190 |
| 2010/0332843 A1 | 12/2010 | Boivie |
| 2010/0332850 A1 | 12/2010 | Boivie |
| 2011/0064217 A1 | 3/2011 | Fry et al. |
| 2011/0145899 A1 | 6/2011 | Cao et al. |
| 2012/0216049 A1 | 8/2012 | Boivie et al. |
| 2012/0216051 A1 | 8/2012 | Boivie et al. |
| 2012/0254993 A1 | 10/2012 | Sallam |
| 2013/0061058 A1 | 3/2013 | Boivie et al. |
| 2013/0167233 A1* | 6/2013 | Sidiroglou ............ H04L 12/585 726/23 |
| 2014/0093084 A1 | 4/2014 | de Atley et al. |
| 2014/0181533 A1 | 6/2014 | Boivie et al. |
| 2015/0007312 A1 | 1/2015 | Pidathala et al. |
| 2015/0019876 A1 | 1/2015 | Boivie |
| 2015/0067045 A1* | 3/2015 | Bharadwaj Shamarao Venkata Rao ..................... H04L 65/4038 709/204 |
| 2015/0089497 A1 | 3/2015 | Borzycki et al. |
| 2015/0207780 A1* | 7/2015 | Grier ................... H04L 63/0407 726/26 |
| 2015/0317256 A1 | 11/2015 | Boivie et al. |
| 2015/0356291 A1* | 12/2015 | Zakorzhevsky ....... G06F 21/564 726/24 |
| 2015/0373041 A1* | 12/2015 | Sidiroglou ............ H04L 12/585 726/23 |
| 2017/0068815 A1* | 3/2017 | Lu ........................ G06F 21/566 |

FOREIGN PATENT DOCUMENTS

| | | |
|---|---|---|
| JP | 2001230770 A | 8/2001 |
| JP | 2001318787 A | 11/2001 |
| JP | 2006209703 A | 8/2006 |
| JP | 2006227777 A | 8/2006 |
| JP | 2007233426 A | 9/2007 |
| WO | WO9854633 A | 12/1998 |
| WO | WO2008003833 A1 | 1/2008 |

OTHER PUBLICATIONS

Nakamoto et al, Desktop Demilitarized Zone, IEEE, 2011, pp. 1487-1492.*
Combined Search and Examination Report, dated Dec. 20, 2012, regarding Application No. GB1215241.9, 7 pages.
International Search Report and Written Opinion, dated Oct. 1, 2010, regarding Application No. PCT/2010/001811, 12 pages.
International Preliminary Report on Patentability, dated Jan. 4, 2012, regarding Application No. PCT/2010/001811, 6 pages.
"SAP Functions in Detail; Crystal Reports Server—A Functional Overview," copyright 2009, SAP AG, 16 pages.
Azagury et al., A Two Layered Approach for Securing an Object Store Network, Proceedings of First International IEEE Security in Storage Workshop, Dec. 2002, pp. 10-23.

(56) References Cited

OTHER PUBLICATIONS

Barnes, "Use Cases and Requirements for JSON Object Signing and Encryption (JOSE)," IP.com Prior Art Database Technical Disclosure No. 000236247, Apr. 1, 2014, 51 pages.
Boivie, "SecureBlue++: CPU Support for Secure Execution," IBM Research Report RC25287, May 23, 2012, 10 pages.
Firley, "An Overview of Virtual Machine Security Features," IP.com Prior Art Database Technical Disclosure No. IPCOM000148883D, Mar. 30, 2007, 114 pages.
Frincke, "Developing Secure Objects," Proceedings of the 19th National Information Systems Security Conference, Oct. 1996, pp. 410-419.
Haifeng et al., "Memory Confidentiality and Integrity Protection Method Based on Variable Length Counter," 11th International Symposium on Distributed Computing and Applications to Business, Engingeering & Science (DCABES 12), Oct. 2012, pp. 290-294.
Haifeng et al., "Memory Confidentiality and Integrity Protection Method Based on Variable Length Counter," Journal of Algorithms & Computational Technology, vol. 8, No. 4, Dec. 2014, pp. 421-440. (Abstract only).
Levy, "Capability-Based Computer Systems," Digital Press, 1984, 231 pages.
Linden, "Operating System Structures to Support Security and Reliable Software," National Bureau of Standards Technical Note 919, Aug. 1976, 29 pages.
Mell et al., "The NIST Definition of Cloud Computing," National Institute of Standards and Technology Special Publication 800-145, Sep. 2011, 7 pages.
Rembarz et al., "Private Domains in Networks of Information," IEEE International Conference on Communications Workshop, Jun. 2009, 5 pages.
Roca et al. "FCAST: Object Delivery for the Asynchomous Layered Coding (ALC) and NACK-Oriented Reliable Multimast (NORM) Protocols," IP.com Prior Art Database Technical Disclosure No. 000228843, Jul. 1, 2013, 81 pages.
Somogyi et al., "NbIDL: Secure, Object-oriented Client-Server Middleware," Information Networking Institute, Carnegie Mellon University, INI TR 1998-10, May 1999, 21 pages.
Suh et al., "Efficient Memory Integrity Verification and Encryption for Secure Processors," Proceedings of the 36th Annual IEEE/ACM International Symposium on Microarchitecture, Dec. 2003, 13 pages.
Wang et al., "Keep Passwords Away from Memory: Password Caching and Verification Using TPM," 22nd International Conference on Advanced Information Networking and Applications, Mar. 2008, pp. 755-762.
Williams et al., CPU Support for Secure Executables, Proceedings of 4th International Conference on Trust and Trustworthy Computing, Jun. 2011, pp. 172-187.
Yang et al., "Fast Secure Processor for Inhibiting Software Piracy and Tampering," Proceedings of the 36th Annual IEEE/ACM International Symposium on Microarchitecture, Dec. 2003, 10 pages.
List of IBM Patents or Patent Applications Treated as Related, 2 pages.
Office Action, dated Mar. 26, 2012, regarding U.S. Appl. No. 12/492,738, 17 pages.
Final Office Action, dated Jun. 5, 2013, regarding U.S. Appl. No. 12/492,738, 17 pages.
Office Action, dated Aug. 14, 2013, regarding U.S. Appl. No. 12/492,738, 18 pages.
Final Office Action, dated Feb. 12, 2014, regarding U.S. Appl. No. 12/492,738, 30 pages.
Notice of Allowance, dated May 5, 2014, regarding U.S. Appl. No. 12/492,738, 16 pages.
Office Action, dated Mar. 18, 2013, regarding U.S. Appl. No. 12/878,696, 40 pages.
Final Office Action, dated Oct. 4, 2013, regarding U.S. Appl. No. 12/878,696, 46 pages.
Office Action, dated Jun. 26, 2015, regarding U.S. Appl. No. 12/878,696, 57 pages.
Office Action, dated Nov. 20, 2012, regarding U.S. Appl. No. 13/033,455, 35 pages.
Final Office Action, dated Jul. 16, 2013, regarding U.S. Appl. No. 13/033,455, 40 pages.
Notice of Allowance, dated Jul. 7, 2014, regarding U.S. Appl. No. 13/033,455, 30 pages.
Office Action, dated Nov. 9, 2012, regarding U.S. Appl. No. 13/033,367, 37 pages.
Final Office Action, dated Mar. 25, 2013, regarding U.S. Appl. No. 13/033,367, 41 pages.
Notice of Allowance, dated Jul. 23, 2013, regarding U.S. Appl. No. 13/033,367, 26 pages.
Office Action, dated May 30, 2014, regarding U.S. Appl. No. 14/017,555, 47 pages.
Final Office Action, dated Dec. 3, 2014, regarding U.S. Appl. No. 14/017,555, 43 pages.
Notice of Allowance, dated Mar. 26, 2015, regarding U.S. Appl. No. 14/017,555, 10 pages.
Office Action, dated Aug. 14, 2013, regarding U.S. Appl. No. 13/226,079, 42 pages.
Final Office Action, dated Mar. 19, 2014, regarding U.S. Appl. No. 13/226,079, 22 pages.
Office Action, dated Oct. 8, 2014, regarding U.S. Appl. No. 13/226,079, 23 pages.
Final Office Action, dated Mar. 13, 2015, regarding U.S. Appl. No. 13/226,079, 25 pages.
Boivie et al., "System and Method for Supporting Secure Objects Using a Memory Access Control Monitor," U.S. Appl. No. 14/839,691, filed Aug. 28, 2015, 56 pages.
Office Action, dated Nov. 23, 2015, regarding U.S. Appl. No. 14/454,075, 33 pages.
Notice of Allowance, dated Dec. 14, 2015, regarding U.S. Appl. No. 12/878,696, 10 pages.
PCT Notification Concerning Transmittal of Copy of International Preliminary Report on Patentability dated Jan. 12, 2012, regarding PCT Application No. PCT/US2010/001811, 8 pages.
European Search Report, dated Mar. 4, 2016, regarding Application No. 10730270.5, 6 pages.
International Search Report and Written Opinion, dated May 4, 2016, regarding Application No. PCT/IB2015/059549, 9 pages.
Internet Society RFCS et al., "FCAST: Object Delivery for the Asynchronous Layered Coding (ALC) and NACK-Oriented Reliable Multicast (NORM) Protocols (RFC6968)", IP.com Prior Art Technical Disclosure No. IPCOM000228843D, Jul. 10, 2013, 81 pages. http://ip.com/IPCOM/000228843.
Internet Society RFCS et al., "Use Cases and Requirements for JSON Object Signing and Encryption (JOSE) (RFC7165)", IP.com Prior Art Database Technical Disclosure No. IPCOM000236247D, Apr. 16, 2014, 51 pages. http://ip.com/IPCOM/000236247.
Software Patent Institute et al., "An Overview of Virtual Machine Security Features", IP.com Prior Art Database Technical Disclosure No. IPCOM00014883D, Mar. 30, 2007, 177 pages. http://ip.com/IPCOM/000148883.
Office Action, dated Nov. 23, 2016, regarding U.S. Appl. No. 15/149,884, 32 pages.
Notice of Allowance, dated Mar. 27, 2017, regarding U.S. Appl. No. 15/149,884, 15 pages.
Office Action, dated Jul. 15, 2016, regarding U.S. Appl. No. 14/954,977, 37 pages.
Final Office Action, dated Jan. 25, 2017, regarding U.S. Appl. No. 14/954,977, 26 pages.
Notice of Allowance, dated Apr. 18, 2016, regarding U.S. Appl. No. 14/454,075, 5 pages.
Office Action, dated May 24, 2016, regarding U.S. Appl. No. 14/745,851, 61 pages.
Final Office Action, dated Nov. 29, 2016, regarding U.S. Appl. No. 14/745,851, 22 pages.
Notice of Allowance, dated Feb. 15, 2017, regarding U.S. Appl. No. 14/745,851, 27 pages.

(56) References Cited

OTHER PUBLICATIONS

Office Action, dated Mar. 3, 2017, regarding U.S. Appl. No. 14/839,691, 17 pages.

* cited by examiner

PROTECTING FROM UNINTENTIONAL MALWARE DOWNLOAD

CROSS-REFERENCE TO RELATED APPLICATIONS

The present application is related to the following patent applications, all of which are incorporated herein by reference: U.S. patent application Ser. No. 12/492,738, filed on Jun. 26, 2009, entitled "Support for Secure Objects in a Computer System", issued as U.S. Pat. No. 8,819,446; U.S. patent application Ser. No. 12/878,696, filed on Sep. 9, 2010, entitled "Cache Structure for a Computer System Providing Support for Secure Objects"; U.S. patent application Ser. No. 13/033,367, filed on Feb. 23, 2011, entitled "Secure Object Having Protected Region, Integrity Tree and Unprotected Region", issued as U.S. Pat. No. 8,578,175; U.S. patent application Ser. No. 13/033,455, filed on Feb. 23, 2011, entitled "Building and Distributing Secure Object Software", issued as U.S. Pat. No. 8,954,752; U.S. patent application Ser. No. 13/226,079, filed on Sep. 6, 2011, entitled "Protecting Application Programs from Malicious Software or Malware"; and U.S. patent application Ser. No. 14/839,691, filed on Aug. 28, 2015, entitled "System and Method for Supporting Secure Objects Using a Memory Access Control Monitor".

BACKGROUND

1. Field

The disclosure relates generally to data processing system protection and more specifically to protecting a data processing system from unintentional malware download.

2. Description of the Related Art

Malicious software, or malware for short, is any software used to disrupt computer operations, gather sensitive information stored on computers, or gain access to private computer systems and networks, for example. Malware is an umbrella term referring to a variety of hostile or intrusive software, such as, for example, computer viruses, worms, Trojan horses, ransomware, spyware, adware, scareware, and other malicious programs.

Malware often gets into an individual's personal computer or mobile device or into an enterprise's computer network via an email attachment or a link to a Web site that contains malware. When a user clicks on an attachment in an email, an email program opens the attachment with a program, such as a word processing program. After the program opens the email attachment, the user's device may become infected with malware if the program that opens the attachment has a vulnerability that an attacker can exploit with a carefully designed attachment. Similarly, when a user clicks on a link to a Web site in an email, the user's device may become infected if the Web site contains some carefully crafted malware. These malicious attacks, known as phishing attacks when an email casts a wide net to multiple individuals or spear-phishing attacks when an email targets a particular individual, have been a problem for some time.

SUMMARY

According to one illustrative embodiment, a computer-implemented method for protection from malware download is provided. A data processing system receives a first input to access one of an email attachment or a web site link using an application. The data processing system obtains a newly generated secure virtual machine from one of a network server or a cloud computing service. The data processing system sends the one of the email attachment or the web site link to the newly generated secure virtual machine for processing. According to other illustrative embodiments, a data processing system and computer program product for protection from malware download are provided.

DETAILED DESCRIPTION

Figure 1:
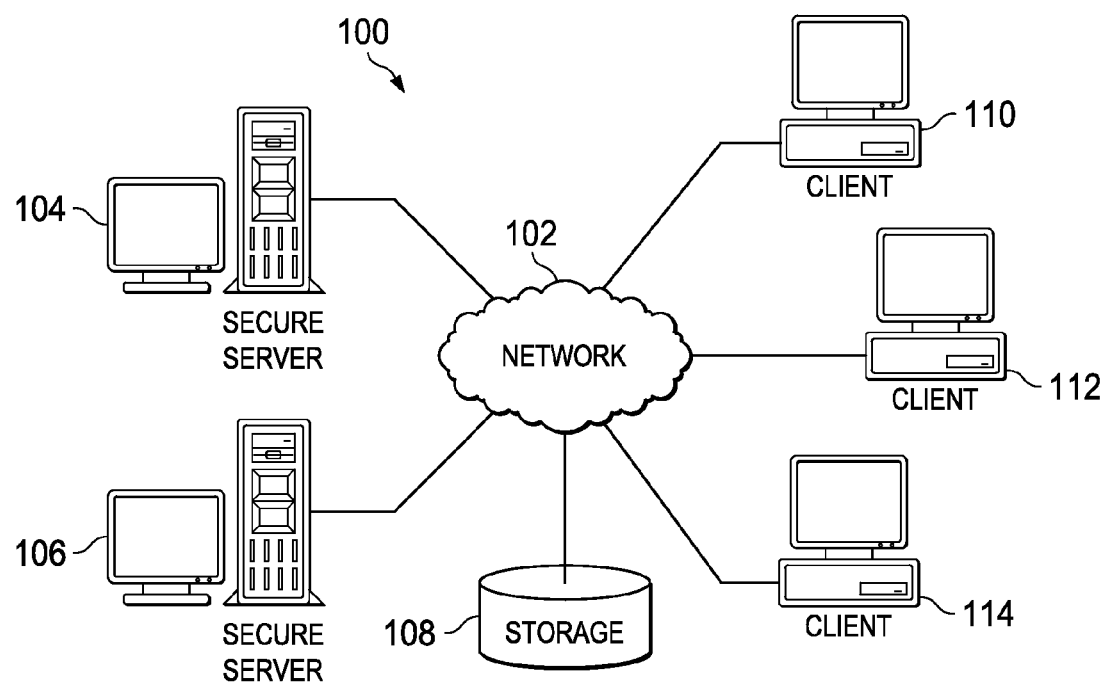
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, secure server 104 and secure server 106 connect to network 102, along with storage 108. Secure server 104 and secure server 106 may be, for example, server computers with high-speed connections to network 102. In addition, secure server 104 and secure server 106 may include secure central processing unit technology that is capable of processing encrypted code and data of a secure application internally to protect sensitive information corresponding to the secure application. Further, secure server 104 and secure server 106 may provide services, such as, for example, protecting client devices of subscribing users from unintentional download of malware from an email attachment or a Web site.

Client 110, client 112, and client 114 also connect to network 102. Clients 110, 112, and 114 represent subscribing client devices to the malware protection services provided by secure server 104 and secure server 106. Secure server 104 and secure server 106 also may provide information, such as boot files, operating system images, virtual machine images, and software applications to clients 110, 112, and 114.

Clients 110, 112, and 114 may be data processing systems, such as, for example, network computers, desktop computers, laptop computers, tablet computers, handheld computers, smart phones, smart watches, personal digital assistants, gaming devices, or any combination thereof. However, it should be noted that clients 110, 112, and 114 are intended as examples only. In other words, clients 110, 112, and 114 may represent other types of data processing systems, such as virtual machine environments. A virtual machine environment includes physical resources used to host and execute virtual machines to perform a set of one or more workloads or tasks. A virtual machine environment may comprise, for example, one server, a rack of servers, a cluster of servers, such as a data center, a cloud of computers, such as a private cloud, a public cloud, or a hybrid cloud, or any combination thereof.

Storage 108 is a network storage device capable of storing any type of data in a structured format or an unstructured format. Data stored in storage 108 may include, for example, malware protection managers, secure objects, such as secure applications and secure virtual machines, graphical desktop sharing tools, and analytics programs. Further, storage unit 108 may store other types of data, such as authentication or credential data that may include user names, passwords, and biometric data associated with system administrators and registered users.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
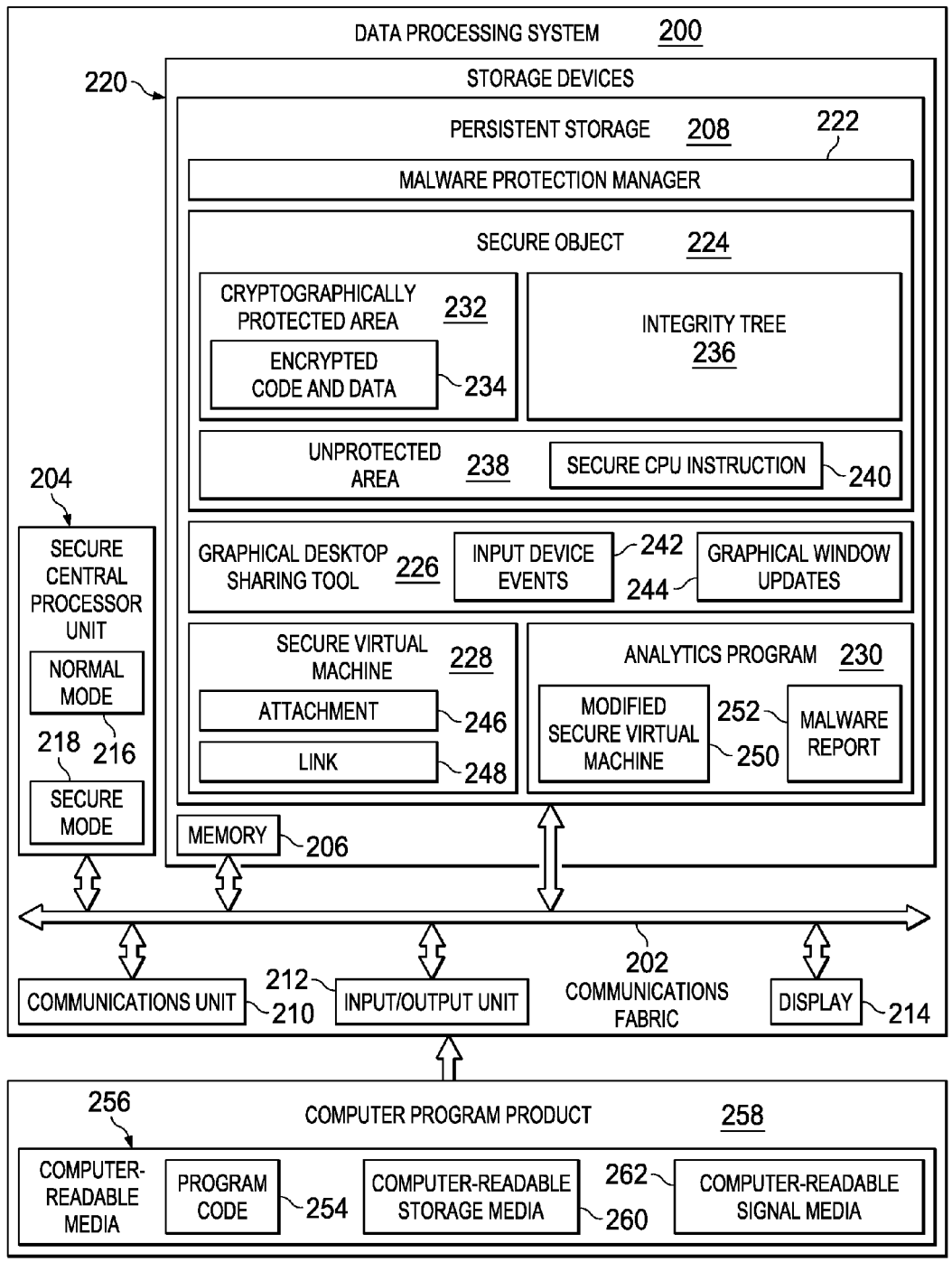
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as secure server 104 or client 110 in FIG. 1, in which computer readable program code or instructions implementing processes of illustrative embodiments may be located. In this illustrative example, data processing system 200 includes communications fabric 202, which provides communications between secure central processor unit 204, memory 206, persistent storage 208, communications unit 210, input/output (I/O) unit 212, and display 214.

Secure central processor unit 204 serves to execute instructions for software applications and programs that may be loaded into memory 206. Secure central processor unit 204 may be a set of one or more hardware processor devices or may be a multi-processor core, depending on the particular implementation. Further, secure central processor unit 204 may be implemented using one or more heterogeneous processor systems, in which a main processor is present with secondary processors on a single chip. As another illustrative example, secure central processor unit 204 may be a symmetric multi-processor system containing multiple processors of the same type.

Furthermore, secure central processor unit 204 may execute the instructions for software applications and programs in normal mode 216 or secure mode 218. When in normal mode 216, secure central processor unit 204 executes the instructions for software applications and programs as any processor would execute instructions. When in secure mode 218, secure central processor unit 204 decrypts encrypted code and data of the software applications and programs internally and executes the decrypted code and data to protect the confidentiality and integrity of the code and data.

Memory 206 and persistent storage 208 are examples of storage devices 220. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores malware protection manager 222, secure object 224, graphical desktop sharing tool 226, secure virtual machine 228, and analytics program 230. Malware protection manager 222 protects data processing system 200 from unintentional download of malware by processing email attachments and Web site content using a set of one or more secure virtual machines executing on secure central processor unit 204.

Secure object 224 may be, for example, a secure application. A secure application consists of: 1) a cryptographically protected area containing encrypted code and data, such as cryptographically protected area 232 containing encrypted code and data 234; 2) an integrity tree, such as integrity tree 236, that protects the integrity of the information in cryptographically protected area 232; and 3) an unprotected area that includes a secure central processor unit instruction, such as unprotected area 238 that includes secure central processor unit instruction 240. Secure central processor unit instruction 240 causes secure central processor unit 204 to enter secure mode 218 when processing encrypted code and data 234 of secure object 224. Secure central processor unit 204 decrypts and checks the integrity of encrypted code and data 234 as the code and data are brought into secure central processor unit 204 (i.e., into an on-chip cache of secure central processor unit 204) from memory 206. Secure central processor unit instruction 240 includes a cryptographic key for accessing encrypted code and data 234, as well as, an initial value for integrity tree 236 and secure central processor unit instruction 240 is protected by a system key that is not available to any other software. Cryptographic operations only occur when the cryptographically protected information moves between the on-chip cache and memory 206. Similarly, checking and updating of integrity values only occur when the cryptographically protected information moves between the on-chip cache and memory 206.

Malware protection manager 222 utilizes graphical desktop sharing tool 226 to remotely control another computer connected to a network. Graphical desktop sharing tool 226 may transmit input device events 242, such as, for example, keyboard events or mouse events, from data processing system 200 to another computer and receive graphical window updates 244 via the network.

Malware protection manager 222 utilizes secure virtual machine 228 to securely process attachment 246 and link 248. It should be noted that secure virtual machine 228 may be another instance of a secure object, such as secure object 224. Secure virtual machine 228 is isolated from other virtual machines and executes securely while sharing hardware. Attachment 246 represents an email attachment that a user of data processing system 200 wants to access to view its content. Link 248 represents a link to a Web site that the user of data processing system 200 wants to visit to view its content. However, the email attachment or the Web site may contain malware. Consequently, malware protection manager 222 utilizes secure virtual machine 228 to prevent any malware from infecting data processing system 200.

Malware protection manager 222 utilizes analytics program 230 to examine secure virtual machine 228 to determine whether secure virtual machine 228 has been modified while processing either attachment 246 or link 248 indicating possible presence of malware. Modified secure virtual machine 250 represents secure virtual machine 228 after analytics program 230 determines that secure virtual machine 228 has been modified. Analytics program 230 generates malware report 252, which corresponds to modified secure virtual machine 250. Analytics program 230 may send modified secure virtual machine 250 and malware report 252 to a security analyst for further analysis and examination. In addition, analytics program 230 may send malware report 252 to authorities, such as the Federal Bureau of Investigation.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 220, which are in communication with secure central processor unit 204 through communications fabric 202. In this illustrative example, the instructions are in a functional form on persistent storage 208. These instructions may be loaded into memory 206 for running by secure central processor unit 204. The processes of the different embodiments may be performed by secure central processor unit 204 using computer-implemented instructions, which may be located in a memory, such as memory 206. These program instructions are referred to as program code, computer usable program code, or computer readable program code that may be read and run by a processor in secure central processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by secure central processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It should be understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the provider of the service. Broad network access provides for capabilities that are available over a network and accessed through standard mechanisms, which promotes use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
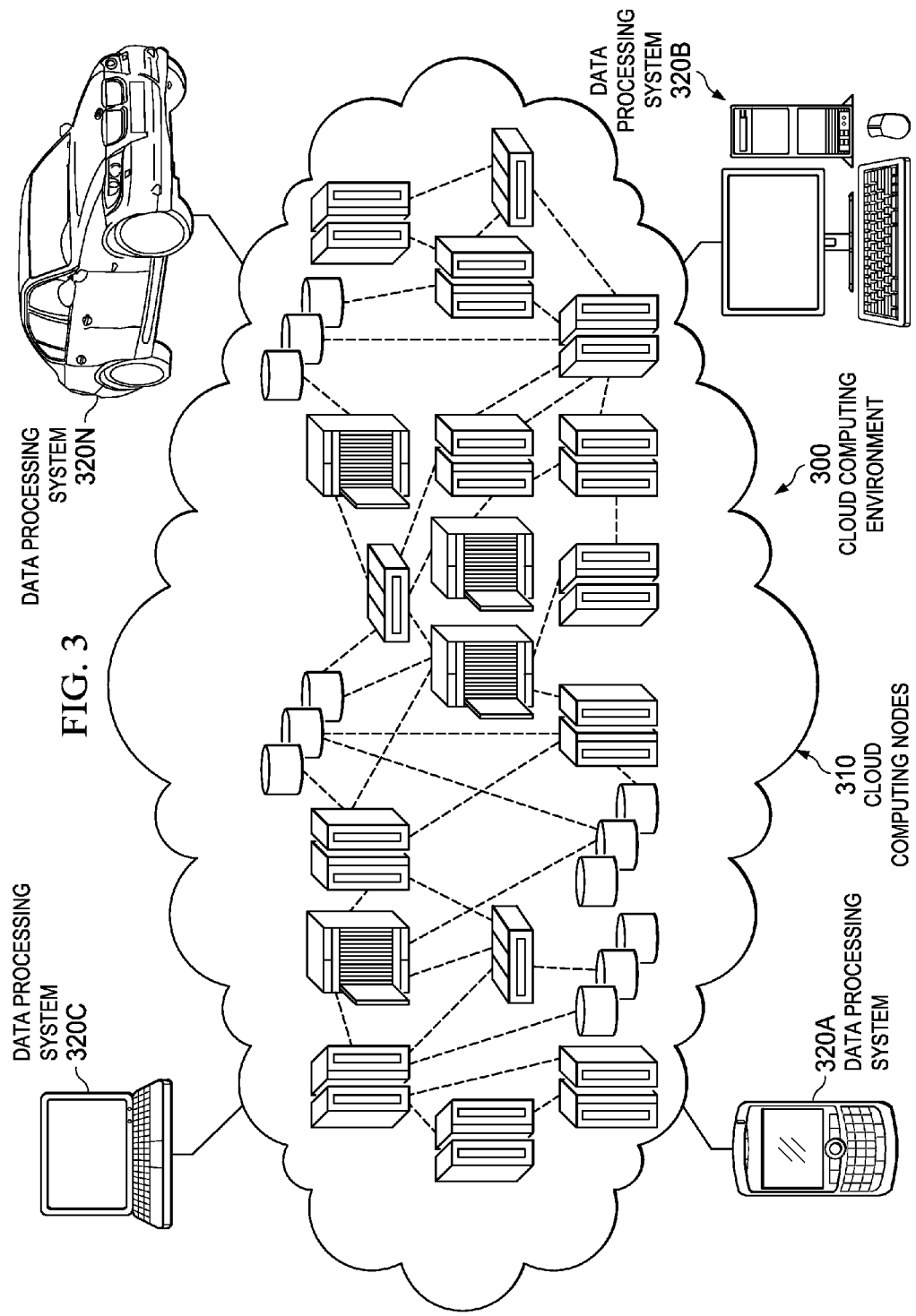
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local data processing systems used by cloud consumers may communicate. Cloud computing nodes 310 may be, for example, server 104 and server 106 in FIG. 1. Local data processing systems that communicate with cloud computing nodes 310 include data processing system 320A, which may be a personal digital assistant or a smart phone, data processing system 320B, which may be a desktop computer or a network computer, data processing system 320C, which may be a laptop computer, and data processing system 320N, which may be a computer system of an automobile. Data processing systems 320A-320N may be, for example, clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as services without requiring the cloud consumers to maintain these resources on their local data processing systems, such as data processing systems 320A-320N. It is understood that the types of data processing devices 320A-320N are intended to be examples only and that cloud computing nodes 310 and cloud computing environment 300 can communicate with any type of computerized device over any type of network and/or network addressable connection using a web browser, for example.

Figure 4:
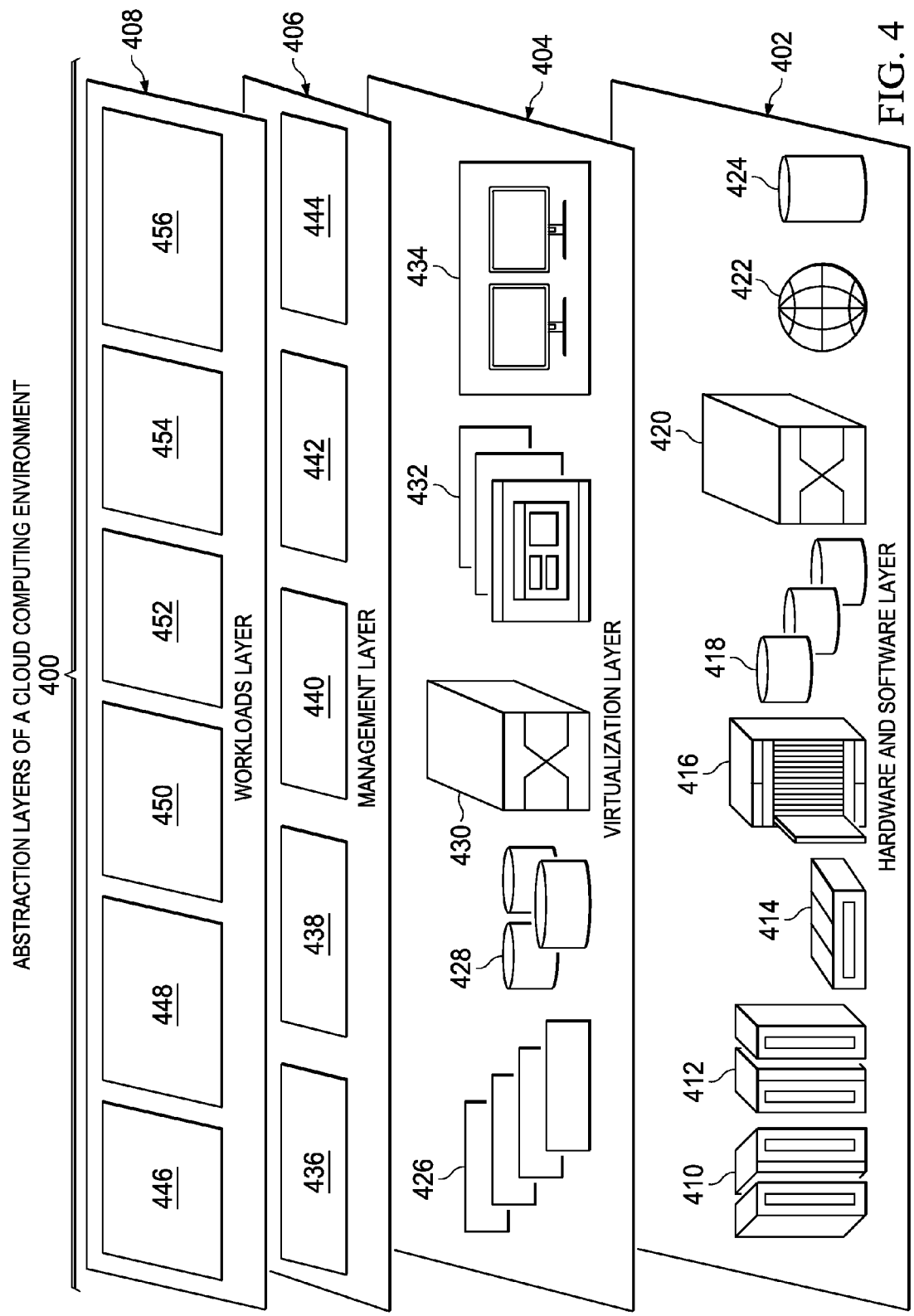
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

In this example, abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430 including virtual private networks; virtual applications and operating systems 432; and secure virtual machines 434.

Management layer 406 may provide a plurality of different management functions, such as, for example, resource provisioning 436, metering and pricing 438, security and user portal 440, service level management 442, and secure virtual machine environment management 444. Resource provisioning 436 dynamically procures computing resources and other resources, which are utilized to perform workloads or tasks within the cloud computing environment. Metering and pricing 438 provides cost tracking as resources are utilized within the cloud computing environment and billing for consumption of these resources. In one example, these resources may comprise application software licenses. Security of security and user portal 440 provides identity verification for cloud consumers and workloads, as well as protection for data and other resources. User portal of security and user portal 440 provides access to the cloud computing environment for cloud consumers and system administrators. Service level management 442 provides cloud computing resource allocation and management such that required service levels are met based on service level agreements. Secure virtual machine environment management 444 provides management of secure virtual machine processing of email attachments and Web site links.

Workloads layer 408 provides the functionality of the cloud computing environment. Example workloads and functions provided by workload layer 408 may include mapping and navigation 446, software development and lifecycle management 448, virtual classroom education delivery 450, data analytics processing 452, transaction processing 454, and protecting data processing systems from unintentional malware downloads 456.

In the course of developing illustrative embodiments, it was discovered that malicious attacks, such as phishing attacks and spear-phishing attacks, can be addressed using a cloud computing service that protects individuals and enterprises from unintentional downloading of malware into their data processing systems. Illustrative embodiments use secure central processor unit technology that protects the confidentiality and integrity of information in a secure object, which may be, for example, a secure application or a secure virtual machine, from all other software on a data processing system including privileged software. Privileged software may include, for example, operating systems, device drivers, and applications running with root privileges, which may also include malware that obtained root privilege by exploiting a vulnerability in the privileged software. Illustrative embodiments utilize the secure central processor unit technology in a cloud computing service environment to protect an individual's or an enterprise's data processing system devices, which may include, for example, computers and mobile devices, from unintentional downloading of malware that may occur when a user of a data processing system either opens an attachment in an email or activates a link to visit a Web site in an email.

A secure object includes cryptographically protected information, such as code and data, which is encrypted for security purposes. The secure central processor unit enters a secure mode while processing the secure object and places the encrypted code and data into an on-chip cache from an external memory that is outside of the secure central processor unit. While in the secure mode, the secure central processor unit decrypts the encrypted code and data inside the secure central processor unit and checks for integrity of the code and data using an integrity tree, for example. As a result, the other software on the data processing system cannot access or undetectably tamper with the information in the secure object.

Illustrative embodiments leverage the use of: 1) secure central processor unit technology; 2) secure servers based on the secure central processor unit technology; 3) virtualization technology that the secure servers utilize to provide secure virtual machines, each virtual machine protected from all other software on the secure servers; 4) a cloud computing service environment that allows a subscribing user to generate, use, de-allocate, and discard secure virtual machines as needed; and 5) a graphical desktop sharing tool that allows the subscribing user on a client device to interact with an application running on a secure virtual machine in the cloud computing service environment. The graphical desktop sharing tool allows the subscribing user to access attachments or Web site links that are contained in an email received by the client device without exposing the user's client device to malware by having an application running on a secure virtual machine in a secure server in the cloud computing service environment open the attachments or Web sites. The client device may be, for example, a desktop computer, a laptop computer, or a mobile device, such as a smart phone, smart watch, a handheld computer, or gaming device connected to a network.

When a subscribing user of the cloud computing service attempts to open an email attachment or visit a Web site corresponding to a link within an email, the email application on the subscribing user's client device: 1) obtains a newly generated secure virtual machine from the cloud computing service environment; 2) opens a graphical window to the newly generated secure virtual machine using a graphical desktop sharing tool that transmits input device events, such as, for example, keyboard and mouse events, from the subscribing user's client device to the newly generated secure virtual machine and receives graphical window updates from the newly generated secure virtual machine; 3) sends the email attachment or the Web site link to the newly generated secure virtual machine; 4) accesses the email attachment or the Web site on the newly generated secure virtual machine; 5) allows the subscribing user to interact with the email attachment or the Web site via the graphical window to the newly generated secure virtual machine using, for example, keypad inputs or touch screen inputs on the subscribing user's client device; and 5) de-allocates and discards the newly generated secure virtual machine in response to the subscribing user closing the email attachment or the Web site.

Thus, illustrative embodiments allow a subscribing user to access an email attachment, but if the email attachment contains malware, illustrative embodiments confine the malware to a newly generated secure virtual machine that is discarded when the user closes the email attachment. Similarly, if the subscribing user activates a Web site link in an email by, for example, a mouse click, a secure application on the subscribing user's client device arranges for the subscribing user to browse the Web site using a browser running on a newly generated secure virtual machine that the subscribing user accesses through a graphical window. Then, if the Web site downloads some form of malware, illustrative embodiments confine the malware download to the newly generated secure virtual machine and discard the newly generated secure virtual machine when the subscribing user leaves the Web site.

An alternative illustrative embodiment may open an email attachment on the subscribing user's client device if the email attachment is signed by a trusted party and open the email attachment on a newly generated secure virtual machine if the email attachment is not signed by a trusted party. Similarly, an alternative illustrative embodiment may launch a browser on the subscribing user's client device to visit a Web site if the Web site is a trusted Web site and launch a browser on a newly generated secure virtual machine if the Web site is not a trusted Web site. Illustrative embodiments may modify a browser program so that the browser program browses un-trusted or external Web sites via a newly generated secure virtual machine, while browsing trusted Web sites directly from a subscribing user's client device.

When illustrative embodiments de-allocate a newly generated secure virtual machine after a subscribing user closes an email attachment or leaves a Web site, illustrative embodiments may send the de-allocated secure virtual machine to an analytics program to determine whether the de-allocated secure virtual machine was modified while processing the email attachment or visiting the Web site. If the analytics program determines that the de-allocated secure virtual machine was modified, the analytics program may send the email attachment or Web site link to security analysts for a more detailed, in-depth analysis and to appropriate law enforcement authorities.

Because the secure central processor unit technology protects the integrity of a secure object, which also is described in one or more of the related applications incorporated herein by reference, each newly allocated secure virtual machine runs exactly the software that the cloud computing service provider intends. As a result, a subscribing user may know with a high level of confidence that a newly allocated secure virtual machine that illustrative embodiments generate for a subscribing user is unadulterated and free of malware when provided to the user. The secure central processor unit technology protects the integrity of a newly generated secure virtual machine from other software even if the other software in the cloud computing service environment, which may include privileged software, such as a hypervisor, operating system, or device driver, has been compromised.

Illustrative embodiments by utilizing the secure central processor unit technology and the secure virtual machine technology, a subscribing user may know with a high level of confidence that a newly generated secure virtual machine, which illustrative embodiments allocate to the subscribing user to process an email attachment or visit a Web site, does not contain malware, such as, for example, spyware that may "snoop" sensitive information located on a client device of the subscribing user and send that sensitive information to an unknown third party. In addition, by illustrative embodiments utilizing the secure central processor unit technology and the secure virtual machine technology, a subscribing user may know with a high level of confidence that any public cryptographic keys or digital certificates, which a newly generated secure virtual machine may use to validate the identity of other servers, have not been compromised. It is important for a subscribing user to know that the public cryptographic keys or digital certificates have not been compromised because it allows the user to know that the user really is connected to a Web site corresponding to the user's bank, for example, and not to a fraudulent bank Web site that an imposter has set up to appropriate bank account information.

Further, by illustrative embodiments utilizing the secure central processor unit technology and the secure virtual machine technology, a subscribing user may know with a high level of confidence that any sensitive information of the subscribing user that a newly generated secure virtual machine processes will not be accessible by any other software running on the cloud computing service environment, even if privileged software, such as a hypervisor, has been compromised in the cloud computing service environment.

Furthermore, when illustrative embodiments de-allocate a newly generated secure virtual machine after a subscribing user has finished using the newly generated secure virtual machine, the secure central processor unit technology enables accurate analysis of the de-allocated secure virtual machine to determine whether an email attachment or a Web site that the secure virtual machine accessed had downloaded any malware. Because the secure central processor unit technology protects the integrity of a newly generated secure virtual machine from other software, a subscribing user can know: 1) exactly what was in the newly generated secure virtual machine when the newly generated secure virtual machine was allocated to process an email attachment or visit a Web site corresponding to a link contained within an email; and 2) when the newly generated secure virtual machine was de-allocated, that any difference in the newly generated secure virtual machine from the norm after de-allocation is a result of processing the email attachment or visiting the Web site. Illustrative embodiments may send this information to security analysts for a more in-depth analysis, which may be used, for example, to fix software bugs or to blacklist Web sites or sources of emails containing attachments. Illustrative embodiments also may send this information to appropriate law enforcement authorities, such as, for example, the Federal Bureau of Investigation.

Figure 5:
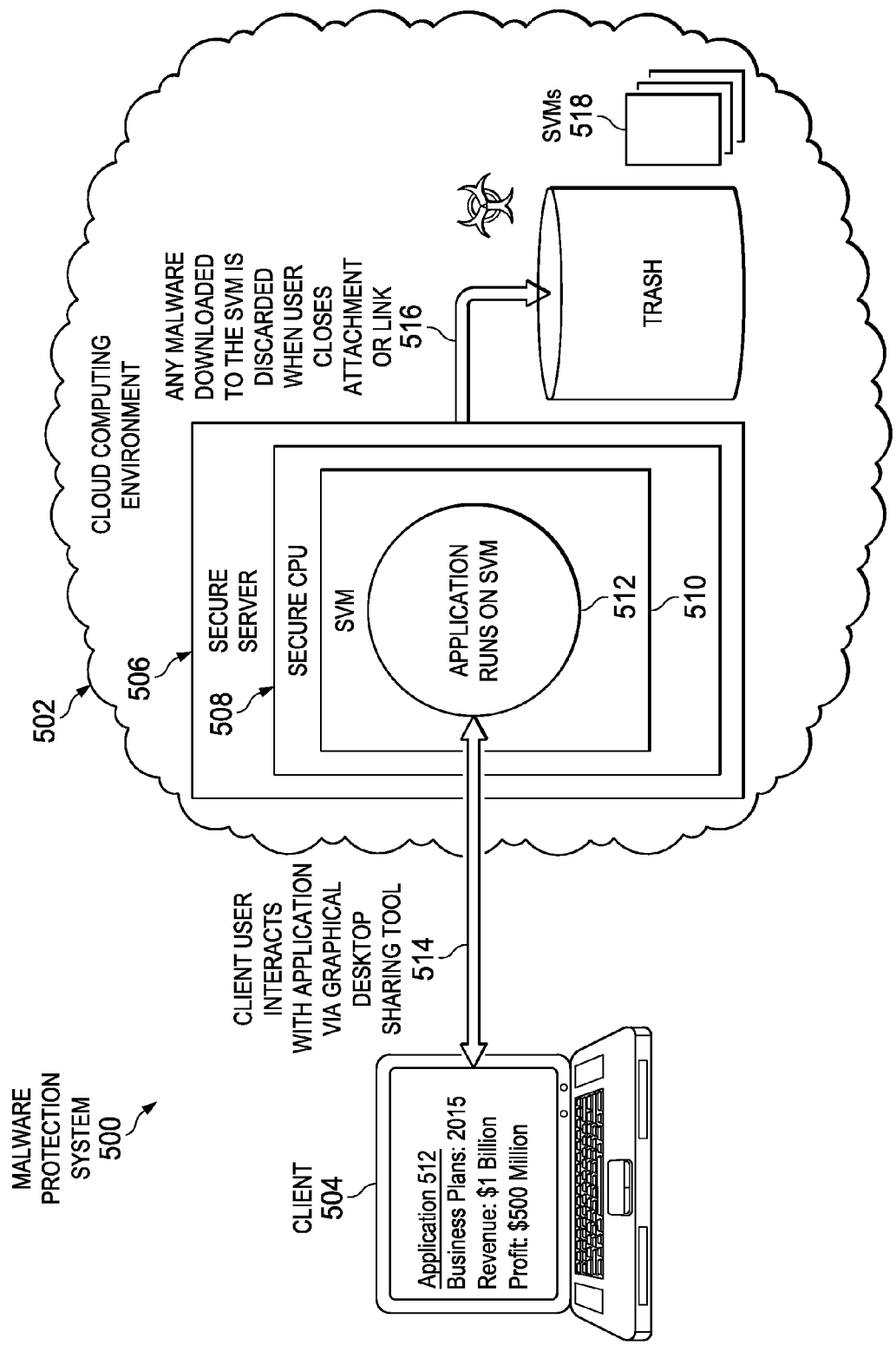
FIG. 5 is a diagram of an example of a malware protection system in accordance with an illustrative embodiment.

With reference now to FIG. 5, a diagram of an example of a malware protection system is depicted in accordance with an illustrative embodiment. Malware protection system 500 protects client devices from unintentional malware download. Malware protection system 500 may be implemented in a network of data processing systems, such as network data processing system 100 in FIG. 1.

In this example, malware protection system 500 includes cloud computing environment 502 and client 504. Cloud computing environment 502 may be, for example, cloud computing environment 300 in FIG. 3. In addition, cloud computing environment 502 may be, for example, a public cloud, a private cloud, or a hybrid cloud. Client 504 may be, for example, client 110 in FIG. 1. Even though client 504 is shown as a laptop computer in this example, it should be noted that client 504 may represent any type of data processing system, such as a network computer, a desktop computer, a tablet computer, a smart phone, a smart watch, or a gaming device.

Cloud computing environment 502 includes secure server 506. Secure server 506 may be, for example, secure server 104 in FIG. 1 or data processing system 200 in FIG. 2. In addition, secure server 506 may represent any number of secure servers in cloud computing environment 502. Secure server 506 includes secure central processor unit 508, such as secure central processor unit 204 in FIG. 2.

Secure virtual machine 510 executes on secure central processor unit 508. Secure virtual machine 510 may be, for example, secure virtual machine 228 in FIG. 2. In addition, application 512, which is used to open and process an email attachment or web link, runs on secure virtual machine 510. A user of client 504 interacts with application 512 via graphical desktop sharing tool 514. Graphical desktop sharing tool 514 may be, for example, graphical desktop sharing tool 226 in FIG. 2. Any malware downloaded to secure virtual machine 510 in processing an email attachment or a web site link is discarded when the user closes the email attachment or Web site link at 516.

Cloud computing environment 502 also includes secure virtual machines 518. Cloud computing environment 502 may utilize secure virtual machines 518 to process other email attachments or Web site links for secure application 512. However, it should be noted that secure virtual machine 510 may process a set of one or more attachments in an email and/or a set of one or more links to Web sites in the email.

Figure 6:
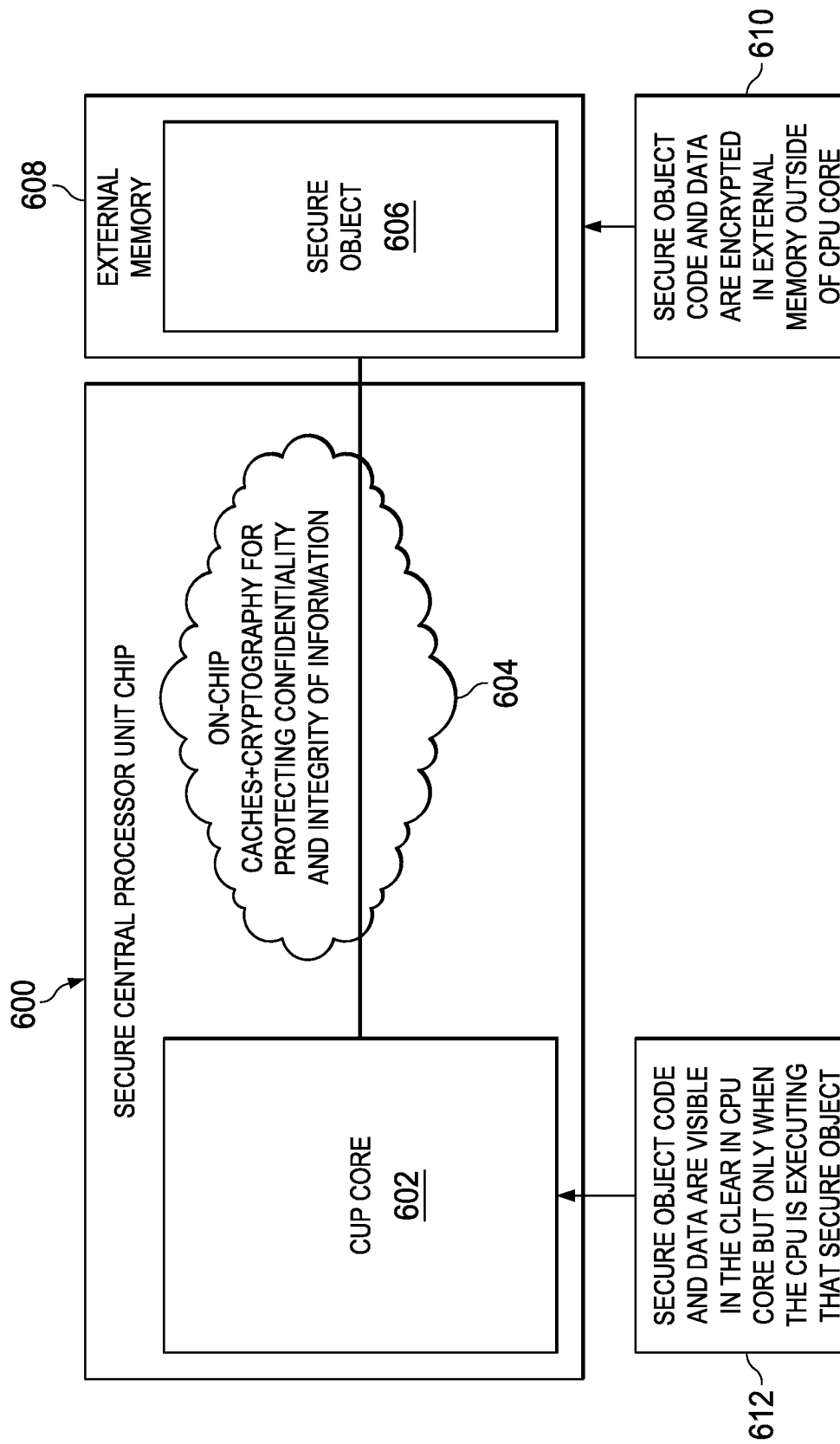
FIG. 6 is a diagram of an example of a secure central processing unit chip in accordance with an illustrative embodiment.

With reference now to FIG. 6, a diagram of an example of a secure central processing unit chip is depicted in accordance with an illustrative embodiment. Secure central processing unit chip 600 may be implemented in, for example, a data processing system, such as data processing system 200 in FIG. 2 or secure server 506 in FIG. 5. Secure central processing unit chip 600 may be, for example, secure central processor unit 204 in FIG. 2 or secure central processor unit 508 in FIG. 5.

Secure central processing unit chip 600 includes central processor unit core 602 and on-chip caches and cryptography 604. On-chip caches and cryptography 604 protect the confidentiality and integrity of information in secure object 606. Secure object 606 may be, for example, secure object 224 that includes encrypted code and data 234 in cryptographically protected area 232 in FIG. 2. Secure object 606 is stored in external memory 608, such as memory 206 in FIG. 2. Secure object 606's code and data are encrypted in external memory 608 outside of secure central processor unit chip 600 at 610. Secure object 606's code and data are decrypted and visible in the clear in central processor unit core 602, but only when central processor unit core 602 is executing secure object 606 at 612.

When secure object 606's information is outside secure central processor unit chip 600, secure object 606's information is encrypted under cryptographic keys that are not available to any other software. When secure object 606's information is inside secure central processor unit chip 600 (e.g., in on-chip caches 604), secure object 606's information is visible in the clear, but context labels prevent other software from accessing or tampering with that information. Secure central processor unit chip 600 uses an integrity tree, such as integrity tree 236 in FIG. 2, to detect tampering of secure object 606's information.

Because secure object 606's information is encrypted whenever it is outside secure central processor unit chip 600 and because other software cannot access the decrypted information inside central processor unit core 602, the other software can only see the encrypted form of secure object 606's information. Thus, illustrative embodiments protect secure object 606's information from all other software on the data processing system including privileged software, such as operating systems, device drivers, or applications running with root privileges, which includes malware that obtained root privileges by exploiting a vulnerability in the privileged software.

Figure 7:
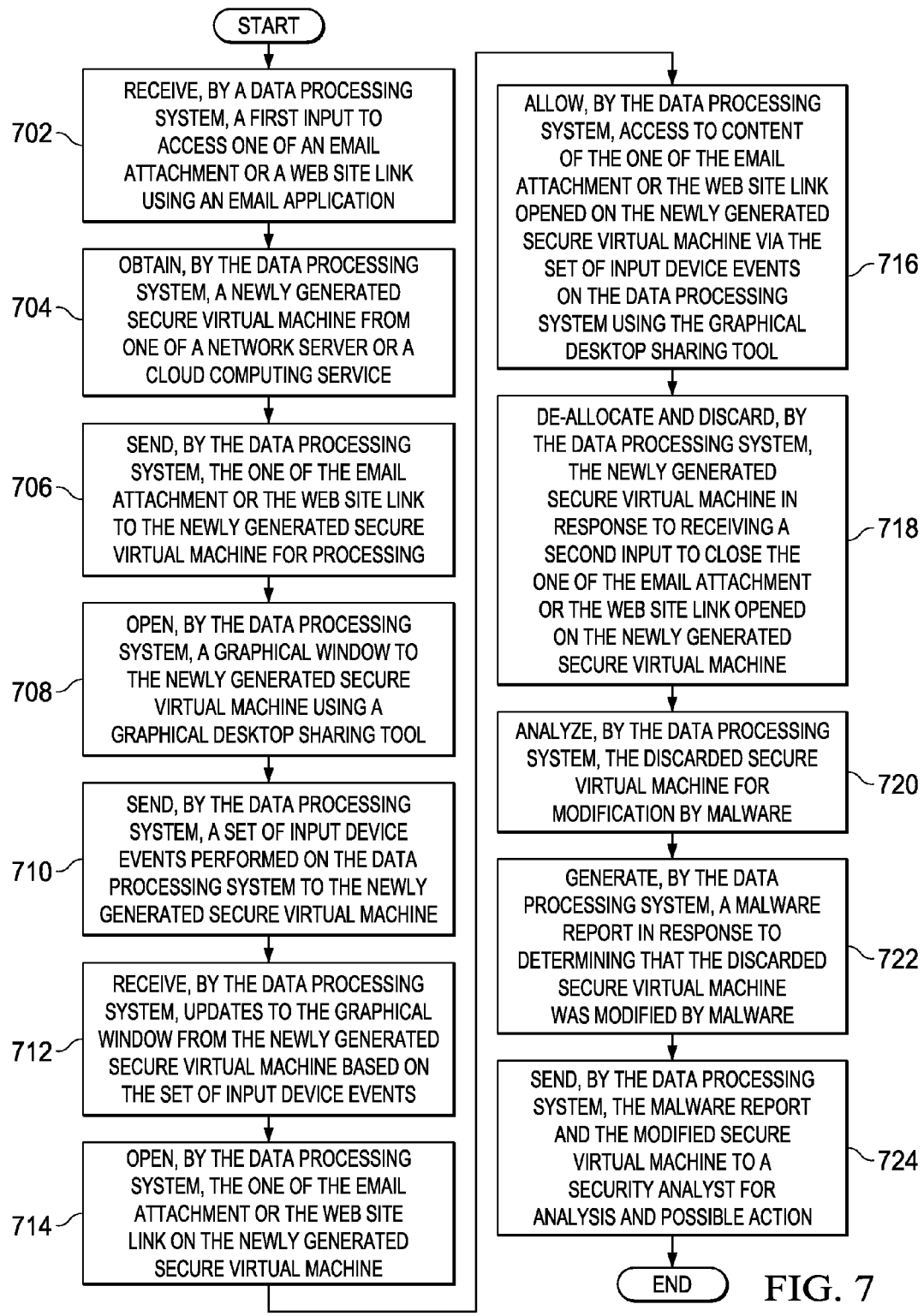
FIG. 7 is a flowchart illustrating a process for protecting a data processing system from unintentional malware download in accordance with an illustrative embodiment.

With reference now to FIG. 7, a flowchart illustrating a process for protecting a data processing system from unintentional malware download is shown in accordance with an illustrative embodiment. The process shown in FIG. 7 may be implemented in a data processing system, such as, for example, server 104 or client 110 in FIG. 1 and data processing system 200 in FIG. 2.

The process begins when the data processing system receives a first input to access one of an email attachment or a web site link using an email application (step 702). The data processing system obtains a newly generated secure virtual machine from one of a network server or a cloud computing service (step 704). The data processing system sends the one of the email attachment or the web site link to the newly generated secure virtual machine for processing (step 706).

The data processing system opens a graphical window to the newly generated secure virtual machine using a graphical desktop sharing tool (step 708). The data processing system sends a set of input device events performed on the data processing system to the newly generated secure virtual machine (step 710). The data processing system receives updates to the graphical window from the newly generated secure virtual machine based on the set of input device events (step 712).

The data processing system opens the one of the email attachment or the web site link on the newly generated secure virtual machine (step 714). The data processing system allows access to content of the one of the email attachment or the web site link opened on the newly generated secure virtual machine via the set of input device events on the data processing system using the graphical desktop sharing tool (step 716). The data processing system de-allocates and discards the newly generated secure virtual machine in response to receiving a second input to close the one of the email attachment or the web site link opened on the newly generated secure virtual machine (step 718).

The data processing system analyzes the discarded secure virtual machine for modification by malware (step 720). The data processing system generates a malware report in response to determining that the discarded secure virtual machine was modified by malware (step 722). The data processing system sends the malware report and the modified secure virtual machine to a security analyst for analysis and possible action (step 724).

Thus, illustrative embodiments of the present invention provide a computer-implemented method, data processing system, and computer program product for protecting a data processing system from unintentional malware download using secure virtual machines and secure central processing units. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for protection from malware download, the computer-implemented method comprising:
    receiving, by a data processing system, a first input to access one of an email attachment or a web site link, wherein the first input is received using a secure application that includes a cryptographically protected area containing encrypted code and data, an integrity tree corresponding to the encrypted code and data in the cryptographically protected area, and an unprotected area that includes a secure central processor unit instruction that is protected by a system key not available to any other software of the data processing system;
    obtaining, by the data processing system, a newly generated secure virtual machine from a cloud computing service, wherein the secure application executes on the newly generated secure virtual machine;
    sending, by the data processing system, the one of the email attachment or the web site link to the newly generated secure virtual machine for processing by the secure application;
    de-allocating and discarding, by the data processing system, the newly generated secure virtual machine in response to receiving a second input to close the one of the email attachment or the web site link opened on the newly generated secure virtual machine;
    analyzing, by the data processing system, the discarded secure virtual machine for modification by malware;
    generating, by the data processing system, a malware report in response to determining that the discarded secure virtual machine was modified by malware; and
    sending, by the data processing system, the malware report and the modified secure virtual machine to a security analyst for further analysis.

2. The computer-implemented method of claim 1 further comprising:
    opening, by the data processing system, a graphical window to the newly generated secure virtual machine using a graphical desktop sharing tool; and
    sending, by the data processing system, a set of input device events performed on the data processing system to the newly generated secure virtual machine.

3. The computer-implemented method of claim 2 further comprising:
    receiving, by the data processing system, updates to the graphical window from the newly generated secure virtual machine based on the set of input device events; and
    opening, by the data processing system, the one of the email attachment or the web site link on the newly generated secure virtual machine.

4. The computer-implemented method of claim 3 further comprising:
    allowing, by the data processing system, access to content of the one of the email attachment or the web site link opened on the newly generated secure virtual machine via the set of input device events on the data processing system using the graphical desktop sharing tool.

5. The computer-implemented method of claim 1, wherein the newly generated secure virtual machine executes on a secure central processor unit.

6. The computer-implemented method of claim 5, wherein the secure central processor unit instruction causes the secure central processor unit to execute the secure application in a secure mode.

7. The computer-implemented method of claim 6, wherein the secure central processing unit executing in the secure mode decrypts the encrypted code and data of the secure application internally using an on-chip cache and a cryptographic key that is included in the secure central processor unit instruction, checks integrity of the encrypted code and data as the encrypted code and data are brought into the on-chip cache using an initial value of the integrity tree that also is included in the secure central processor unit instruction, and executes decrypted code and data protecting confidentiality of the decrypted code and data.

8. A data processing system for protection from malware download, the data processing system comprising:
    a bus system;

a storage device connected to the bus system, wherein the storage device stores program instructions; and a processor connected to the bus system, wherein the processor executes the program instructions to:

receive a first input to access one of an email attachment or a web site link using a secure application that includes a cryptographically protected area containing encrypted code and data, an integrity tree corresponding to the encrypted code and data in the cryptographically protected area, and an unprotected area that includes a secure central processor unit instruction that is protected by a system key not available to any other software of the data processing system;

obtain a newly generated secure virtual machine from a cloud computing service, wherein the secure application executes on the newly generated secure virtual machine;

send the one of the email attachment or the web site link to the newly generated secure virtual machine for processing by the secure application;

de-allocate and discard the newly generated secure virtual machine in response to receiving a second input to close the one of the email attachment or the web site link opened on the newly generated secure virtual machine;

analyze the discarded secure virtual machine for modification by malware;

generate a malware report in response to determining that the discarded secure virtual machine was modified by malware; and send the malware report and the modified secure virtual machine to a security analyst for further analysis.

9. The data processing system of claim 8, wherein the processor further executes the program instructions to:

open a graphical window to the newly generated secure virtual machine using a graphical desktop sharing tool; and send a set of input device events performed on the data processing system to the newly generated secure virtual machine.

10. The data processing system of claim 9, wherein the processor further executes the program instructions to:

receive updates to the graphical window from the newly generated secure virtual machine based on the set of input device events; and open the one of the email attachment or the web site link on the newly generated secure virtual machine.

11. The data processing system of claim 10, wherein the processor further executes the program instructions to:

allow access to content of the one of the email attachment or the web site link opened on the newly generated secure virtual machine via the set of input device events on the data processing system using the graphical desktop sharing tool.

12. A computer program product for protection from malware download, the computer program product comprising a computer readable storage medium having program instructions embodied therewith, the program instructions executable by a data processing system to cause the data processing system to perform a method comprising:

receiving, by the data processing system, a first input to access one of an email attachment or a web site link using a secure application that includes a cryptographically protected area containing encrypted code and data, an integrity tree corresponding to the encrypted code and data in the cryptographically protected area, and an unprotected area that includes a secure central processor unit instruction that is protected by a system key not available to any other software of the data processing system;

obtaining, by the data processing system, a newly generated secure virtual machine from a cloud computing service, wherein the secure application executes on the newly generated secure virtual machine;

sending, by the data processing system, the one of the email attachment or the web site link to the newly generated secure virtual machine for processing by the secure application;

de-allocating and discarding, by the data processing system, the newly generated secure virtual machine in response to receiving a second input to close the one of the email attachment or the web site link opened on the newly generated secure virtual machine;

analyzing, by the data processing system, the discarded secure virtual machine for modification by malware;

generating, by the data processing system, a malware report in response to determining that the discarded secure virtual machine was modified by malware; and sending, by the data processing system, the malware report and the modified secure virtual machine to a security analyst for further analysis.

13. The computer program product of claim 12 further comprising:

opening, by the data processing system, a graphical window to the newly generated secure virtual machine using a graphical desktop sharing tool; and sending, by the data processing system, a set of input device events performed on the data processing system to the newly generated secure virtual machine.

14. The computer program product of claim 13 further comprising:

receiving, by the data processing system, updates to the graphical window from the newly generated secure virtual machine based on the set of input device events; and opening, by the data processing system, the one of the email attachment or the web site link on the newly generated secure virtual machine.

15. The computer program product of claim 14 further comprising:

allowing, by the data processing system, access to content of the one of the email attachment or the web site link opened on the newly generated secure virtual machine via the set of input device events on the data processing system using the graphical desktop sharing tool.

* * * * *